(12) United States Patent
Spaeth et al.

(10) Patent No.: US 8,578,809 B2
(45) Date of Patent: Nov. 12, 2013

(54) SHIFTING DEVICE FOR A VARIABLE SPEED MOTOR VEHICLE TRANSMISSION

(75) Inventors: Klaus Spaeth, Berg (DE); Dieter Fischer, Nonnenhorn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 727 days.

(21) Appl. No.: 12/602,283

(22) PCT Filed: May 27, 2008

(86) PCT No.: PCT/EP2008/056458
§ 371 (c)(1),
(2), (4) Date: Nov. 30, 2009

(87) PCT Pub. No.: WO2008/148663
PCT Pub. Date: Dec. 11, 2008

(65) Prior Publication Data
US 2010/0175493 A1 Jul. 15, 2010

(30) Foreign Application Priority Data
Jun. 6, 2007 (DE) .................. 10 2007 026 422

(51) Int. Cl.
*B60K 17/10* (2006.01)

(52) U.S. Cl.
USPC .................................. 74/473.11; 74/473.36

(58) Field of Classification Search
USPC ............... 74/473.11, 473.36, 473.37, 335
See application file for complete search history.

(56) References Cited

U.S. PATENT DOCUMENTS

| | | | |
|---|---|---|---|
| 4,542,662 A * | 9/1985 | Bieber | 74/470 |
| 5,446,979 A | 9/1995 | Sugiyama et al. | |
| 5,947,000 A | 9/1999 | Kazumori et al. | |
| 6,722,218 B1 * | 4/2004 | Fischer et al. | 74/335 |
| 6,860,291 B2 | 3/2005 | Rub | |
| 8,074,533 B2 | 12/2011 | Fischer et al. | |

FOREIGN PATENT DOCUMENTS

| | | |
|---|---|---|
| DE | 31 47 003 A1 | 10/1983 |
| DE | 195 39 471 A1 | 4/1997 |
| DE | 195 39 472 A1 | 4/1997 |

(Continued)

OTHER PUBLICATIONS

Loomann; Zahnradgetriebe (Geared Transmission); 2nd edition; Springer Verlag; 1988; p. 225.

*Primary Examiner* — Justin Krause
*Assistant Examiner* — Gregory Prather
(74) *Attorney, Agent, or Firm* — Davis & Bujold, PLLC; Michael J. Bujold

(57) ABSTRACT

A shifting device (11, 40) with a servo-assistance mechanism (10), in particular for a transmission (30) of a motor vehicle which comprises an assembly for selecting and engaging a gear of the transmission (30) and an element (20) upon which acts a manual shifting force to be assisted. The servo-assistance mechanism (10) can produce a performance characteristic curve which, as a function of the manual shifting force or a shift phase, has ranges with different gradients or proportions with respect to the manual shifting force. Elements (88, 90, 106, 108), upon which a servo-pressure acts, are present in the servo-assistance mechanism (10) for producing the characteristic. In the control system of the servo-assistance mechanism (10), path limitation units and at least one elastic element (84, 110) are provided, upstream from and/or in the servo-assistance mechanism (10), to limit the servo-assistance force in a path-dependent manner for each gate or gear.

6 Claims, 6 Drawing Sheets

(56) References Cited

FOREIGN PATENT DOCUMENTS

| | | |
|---|---|---|
| DE | 693 19 400 T2 | 12/1998 |
| DE | 198 39 854 A1 | 3/2000 |
| DE | 198 39 855 A1 | 3/2000 |
| DE | 198 40 052 A1 | 3/2000 |
| DE | 10 2004 042 609 A1 | 3/2006 |
| DE | 11 2005 001 257 T5 | 5/2007 |
| DE | 10 2006 006 651 A1 | 8/2007 |
| DE | 10 2006 006 652 A1 | 8/2007 |
| EP | 1 630 460 A2 | 3/2006 |
| EP | 1 381 779 B1 | 5/2006 |
| JP | 61295135 A | 12/1986 |
| WO | 2005/119100 A1 | 12/2005 |
| WO | 2007/101754 A1 | 9/2007 |
| WO | 2008/043690 A1 | 4/2008 |

* cited by examiner

SHIFTING DEVICE FOR A VARIABLE SPEED MOTOR VEHICLE TRANSMISSION

This application is a National Stage completion of PCT/EP2008/056458 filed May 27, 2008, which claims priority from German patent application serial no. 10 2007 026 422.6 filed Jun. 6, 2007.

FIELD OF THE INVENTION

The invention concerns a shifting device with a servo-assistance mechanism.

BACKGROUND OF THE INVENTION

In such shifting devices the rotary movement of the gearshift rod serves to pre-select the individual shift gates and does not generally require any large shifting forces. The axial, longitudinal movement of the shift rod serves to engage the gear desired and, particularly in the case of transmissions for heavy vehicles and vehicles in which the driving seat is some distance away from the transmission, requires larger shifting forces.

Present-day utility vehicles, such as omnibuses and trucks, with their forward control design, provide transmission filling space such that the transmission is necessarily far removed from the driving seat. The distance is particularly large in vehicles with under-floor or rear-mounted engines. Owing to the long and sometimes stiffly moving shift linkage in mechanically shifted transmissions, accurate gearshifts are often made more difficult.

To allow the driver of a motor vehicle to focus his attention completely on the road traffic, he must be assisted and supported as much as possible in all the activities required for driving the motor vehicle.

Every driver knows how decisively important it can be, to be able to operate the transmission without difficulty in difficult traffic situations. In this respect pneumatic shift aids for utility vehicles of any size can be helpful.

Previously known servo-shifting devices are partially built directly onto the transmission and comprise a control rod accessible from outside and piston rods. The shift linkage is connected to the control rod. The assistance mechanism is activated by longitudinal movement of the control rod. This type of control is found in combination with two rod or cable shifts. A disadvantage here is the sealing of the control and piston rods by bellows and the lack of lubrication. In trucks the point concerned is exposed to much dirt. When the shift linkage ratio is changed, the beginning of the servo-assistance also changes or it has to be adapted to the linkage ratio by modifying the valve. The same applies to shift aids consisting of a control valve and a servo-cylinder that are separate from one another. The valve and cylinder are connected, via ball joints, to the shift lever and a cantilever, which is in turn fixed on the transmission. This arrangement has the added disadvantage that during every shift the components move relative to the transmission and the vehicle's chassis, so the air lines by which the valve and the cylinder are connected to one another can be perforated by chafing.

Such pneumatic shift aids are also known in a divided configuration, consisting of a mechanical-pneumatic control portion and a separate, pneumatic force portion. A shift aid of divided configuration is known from Loomann; Zahnradgetriebe (Geared transmissions); 2nd edition; Springer Verlag; 1988; p. 225. The control portion is a mechanically actuated control valve, which is actuated by the shift linkage. In this case movement of the selection lever during gearshifts is transmitted mechanically directly to the transmission. When the shifting movement is transmitted, the control valve is actuated and at the same time the manual shifting force is transferred by a lever to the transmission. The manual shifting force is additionally assisted pneumatically by a compressed-air cylinder. This compressed-air cylinder, which is a two-position cylinder with an integrated hydraulic damper, forms the pneumatic force portion. In this case the manual shifting force is not reflected directly proportionally. The paths between the control and force portions are long, and the structure takes up considerable space. Damage of the compressed-air lines between the control and force portions cannot be avoided.

DE 195 39 472 A1 discloses a shifting device with a servo-assistance mechanism for a motor vehicle transmission. A control rod of the servo-assistance mechanism that can move axially within a piston rod is provided, and co-operates via a shift linkage, with a shift lever. On the piston rod is arranged a piston that can be acted upon on both sides by a pressure medium, and the piston rod co-operates with means for shifting the geared change-speed transmission. When the control rod is moved axially in the piston rod, control valves can be actuated by actuating pistons. The shifting force exerted, via the shift lever and shift linkage, on the control rod is transferred proportionally, via the piston rod, to the means for shifting the geared change-speed transmission. During this the two sides of the shifting device produce shifting forces of different size, so that different gear steps of the vehicle's transmission can be engaged with different shifting forces. The different shifting forces are enabled by different valve characteristics, produced by actuating piston areas of different size and/or by different geometrical dimensions of the two surfaces arranged on opposite sides of the piston.

From DE 10 2006 006 651 A1 a shifting device with a servo-assistance mechanism for a motor vehicle transmission has been made known, which comprises means for shifting and selecting a gear step of a transmission and a control rod of the servo-assistance mechanism, upon which a manual shifting force that is to be supported acts. Elastic elements are provided in the shifting device to change or limit the manual shifting force that acts on the servo-assistance mechanism before the force is applied to the servo-assistance unit.

DE 10 2006 006 652 A1 also discloses a shifting device with a servo-assistance mechanism for a motor vehicle transmission, which comprises means for shifting and selecting a gear step of a transmission and a control rod of the servo-assistance mechanism upon which a manual shifting force to be supported acts. Spring elements are provided in the shifting device to modify the manual shifting force applied to the servo-assistance mechanism within the servo-assistance mechanism before and/or during the production of the servo-assisting force.

To produce different servo-assisting forces, different compliances or elasticities are needed. Depending on the design this can be complicated to realize and can require structural space which is often not available.

DE 10 2004 042 609 A1 proposes performance characteristics for a servo-assistance mechanism of a shifting device of a motor vehicle transmission. As a function of a manual shifting force or a shift phase the characteristics have sections with different gradients or proportionality to the manual shifting force. DE 10 2004 042 609 A1 does not disclose how the characteristics can be realized by design means.

SUMMARY OF THE INVENTION

The purpose of the present invention is to describe a shifting device with a servo-assistance mechanism, with which a servo-characteristic curve, which has sections of a different gradient or proportionality to the manual shifting force as a function of the manual shifting force, can be realized in a path-independent manner and with which a corresponding servo-assistance force can be associated with each gate or gear, with no need for additional structural space.

The shifting device with a servo-assistance mechanism according to the invention, in particular for a motor vehicle transmission, comprises means for selecting and engaging a gear step of the transmission, and an element upon which a manual shifting force that is to be supported acts. This element can consist, for example, of a control rod of the servo-assistance mechanism. According to the invention, the servo-assistance mechanism comprises means for producing a performance characteristic which, as a function of the manual shifting force or a shift phase, has sections with different pitches or proportionality to the manual shifting force, and in the control of the servo-assistance mechanism a path limitation and at least one elastic element are provided upstream from and/or in the servo-assistance mechanism to limit a servo-assistance force for each gate and each gear in a path-dependent manner.

The means for producing the performance characteristic are arranged in the servo-assistance mechanism in such a manner that the characteristic can be produced by a servo-pressure acting on the means in a path-independent manner, i.e. without any change of the current position of the control rod.

By virtue of the path limitation in the control system of the servo-assistance mechanism, the relative movement between the control rod and a piston rod of the servo-assistance mechanism is restricted. This path limitation is so designed that a servo-characteristic curve and therefore a servo-assistance force can be used conditionally, whereby for each gate or each gear a corresponding servo-assistance force can be produced. In this, for example, a servo-characteristic curve can be used which is formed by virtue of an elastic element in the components upstream from or in the servo-assistance mechanism or a combination thereof. For example, the necessary elasticity can be realized by a spring element arranged on the control rod of the servo-assistance mechanism.

In addition, the shifting device comprises a shifting shaft and a hollow shaft. The servo-assistance mechanism comprises a valve with a valve piston and a valve slide, and the piston rod of the servo-assistance mechanism co-operates with means for shifting the transmission.

In a preferred embodiment of the shifting device according to the invention, the means for producing the servo-characteristic curve consist of a trailing piston that co-operates with the valve and a trailing piston spring connected to the trailing piston. The trailing piston spring can be in the form, for example, of a spiral spring or a cup spring.

In a particularly preferred embodiment of the shifting device according to the invention, the trailing piston is arranged inside the piston rod in such manner that the trailing piston surrounds the control rod and the valve piston radially, and is in contact with an abutment of the piston rod. The trailing piston spring rests on one side against an abutment of the piston rod and on the other side is connected to the trailing piston.

For example, the trailing piston can be in the form of a hollow cylinder which, in its actuated condition, acts upon a stop element arranged on the control rod. Likewise, it is conceivable for the trailing piston to be formed as a hollow cylinder and to have an abutment formed on the side opposite the trailing piston spring in the direction toward the control rod, so that in its actuated condition the trailing piston rests with its abutment against the valve piston. Above a given manual shifting force, a regulating servo-pressure becomes high enough for the trailing piston to be pushed, in opposition to the force of the trailing piston spring, against the valve piston or against the abutment on the control rod, which constitutes the actuated condition of the trailing piston. Thus, the manual shifting force or control rod force opposes both the pressure force acting directly on the valve piston and also the pressure force transmitted by the trailing piston to the valve piston or to the stop element arranged on the control rod. Accordingly, beyond a certain regulating position, the pressure force that opposes the manual shifting force or the control rod force is correspondingly increased. This produces an inflexion point in the characteristic curve, beyond which its gradient is smaller so that it is less steep. The position of the inflexion point of the characteristic can be varied as a function of the design of the trailing piston spring.

In a particularly advantageous embodiment of the shifting device according to the invention, means are provided in the servo-assistance mechanism by which the servo-assistance force can be limited to at least two different servo-force levels.

In a preferred embodiment of the shifting device according to the invention, the path limitation in the control of the servo-assistance mechanism can be realized by a groove in the hollow shaft and at least one pin that passes through the groove.

In a further embodiment of the shifting device according to the invention, the path limitation in the control of the servo-assistance mechanism can be realized by a groove in the shifting shaft and at least one pin that passes through or engages in the groove.

In these cases the groove in the hollow shaft or the shifting shaft can be designed such that in the axial direction of the shifting shaft there is rotational clearance between the pin and the groove which is of different size for each gate or each gear. For example, the rotational clearance on one side of the groove can be of a size different from those on the opposite side of the groove, in order to produce different servo-assistance forces in different shift positions within the same shift gate of the transmission.

In another embodiment the relative movement between the control rod and the piston rod of the servo-assistance mechanism is limited by a bore in the shifting shaft, for example a slewed bore. By virtue of this bore, corresponding clearance are produced between the shifting shaft and a pin arranged in the bore, whereby corresponding rotational clearance are produced between the shifting shaft and the hollow shaft and the servo-assistance force can accordingly be limited.

Thus, the path limitation enables a mechanical bridging of the servo-assistance mechanism whereby the servo-assistance force can be limited as a function of the gate or gear. The means for limiting the path of the control rod of the servo-assistance mechanism can also be located elsewhere in the shifting device or unit, and can then be designed differently.

Thus, by virtue of the shifting device with its servo-assistance mechanism according to the invention an "inflected" servo-characteristic curve can be produced without changing the position of the control rod, and the path limitation means provided in the control of the servo-assistance mechanism can limit the actuation of the control rod of the servo-assistance mechanism relative to the piston rod in a path-dependent or gear-dependent manner, whereby a corresponding servo-assistance force can be produced in the path-dependent or gear-dependent way.

Accordingly, by virtue of the shifting device and servo-assistance mechanism according to the invention, at the beginning of a shift a sufficiently large servo-assistance force can be ensured, such that during a synchronous phase the servo-assistance force produced does not overload the components or synchronizers involved in the shift operations. For example, the shifting device according to the invention can be used in transmissions with shift linkages or cable shifts.

BRIEF DESCRIPTION OF THE DRAWINGS

Below, the basic principle of the invention, which can be embodied in many forms, is explained in greater detail as an example with reference to a drawing, which shows.

DETAILED DESCRIPTION OF THE PREFERRED EMBODIMENTS

Figure 1:
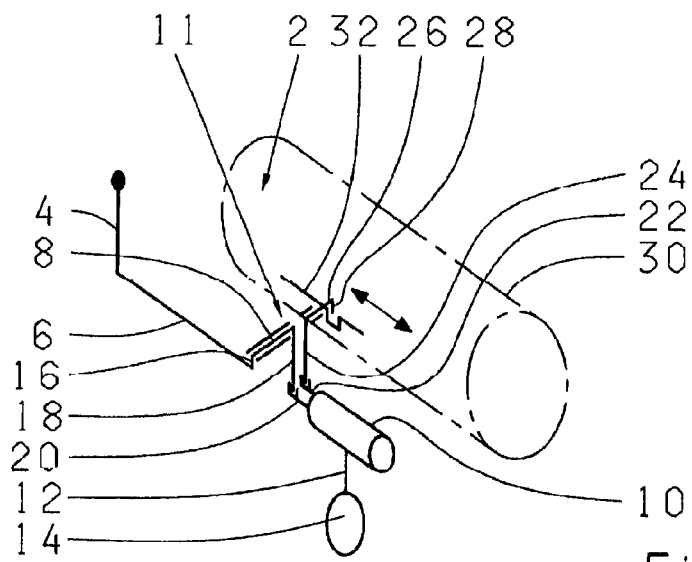
FIG. 1: Shifting unit of the prior art.

FIG. 1 is a sketch showing the shifting unit 2 of a motor vehicle, according to the prior art. From a shift lever 4 a shift rod 6 leads, via a lever deflection 8 to a shifting device 11 with a pneumatic servo-assistance mechanism 10. The pneumatic servo-assistance mechanism 10 comprises a connection line 12 leading to a reservoir container 14, from which the pneumatic servo-assistance mechanism 10 is supplied with compressed air. The lever deflection comprises a first lever 16, which is preferably articulated to the shift rod 6. The lever deflection 8 comprises a second lever 18, which in turn engages in a control rod 20 arranged in the pneumatic servo-assistance mechanism 10. Furthermore, in the pneumatic servo-assistance mechanism 10 a piston rod 22 is provided, in which there engages a lever 24 which is connected, via a rotating shifting shaft 26, to a lever 28 in the transmission 30 of the vehicle. The lever 28 engages in a shift rail 32 by means of which, in a known way, transmission ratios of the transmission can be engaged. Movement of the lever 24 is converted by the shifting shaft 26 into movement of the lever 28, so that the lever 28 can move the shift rail 32 axially. By virtue of that movement the shift rail 32 adopts preferably three positions, namely two axial end positions, each respectively corresponding to an engaged transmission ratio, and a central position between the end positions, which corresponds to a neutral setting of the transmission.

Figure 2:
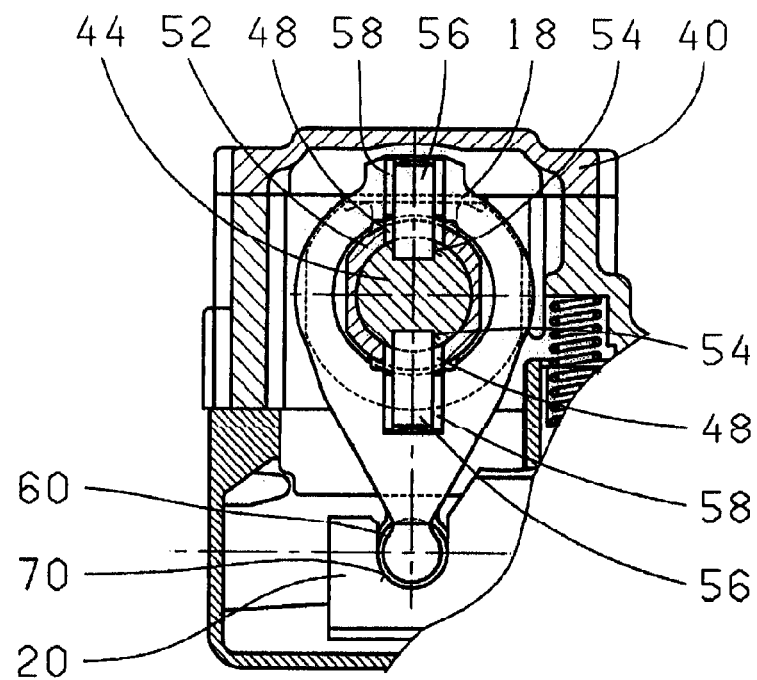
FIG. 2: Sectional view of an embodiment of the shifting device.

FIG. 2 shows a sectioned view of the shifting device 40 according to the invention. A shifting shaft 44 is fitted to rotate about its axis within a hollow shaft 52. The hollow shaft 52 is fitted within the shifting device 40 to rotate about the axis of the shifting shaft 44. On its circumference the shifting shaft 44 is provided with grooves 54 along its axis. In these grooves 54 in the shifting shaft 44 engage pins 56 which are mounted to rotate in needle sockets 58 in the lever 18. The pins 56 are arranged in the grooves 54 in such manner that axial displacement of the shifting shaft 44 along its axis is possible and rotation of the shifting shaft 44 about its axis causes the lever 18 to pivot.

With a roller 60, for example arranged to rotate freely on a bolt, the lever 18 engages in a pocket 70 in the control rod 20 and enables a low-friction transfer of the manual shifting force to the pneumatic servo-assistance mechanism 10. A servo-assistance force produced by the servo-assistance mechanism 10 is transmitted by the piston rod 22 to the lever 24 (see FIG. 1) and from there to the hollow shaft 52.

By a path limitation in the control system of the servo-assistance mechanism 10, different servo-assistance forces can be produced. In this case the path limitation means are designed such that there are corresponding rotational clearance between the shifting shaft 44 and the hollow shaft 52, which are produced by grooves 48 in the hollow shaft 52 and pins 56. By an appropriate design of the groove 48 in the hollow shaft 52, different rotational clearance can be produced between the shifting shaft 44 and the hollow shaft 52. The servo-assistance force is maintained until the rotational clearance between the shifting shaft 44 and the hollow shaft 52 is eliminated. Thereafter, the manual shifting force is transmitted directly to the hollow shaft 52 and the control rod 20 moves no farther relative to the piston rod 22 of the servo-assistance mechanism 10. In this embodiment the hollow shaft 52 and the lever 18 are arranged so that they can move axially relative to one another.

Figure 3:
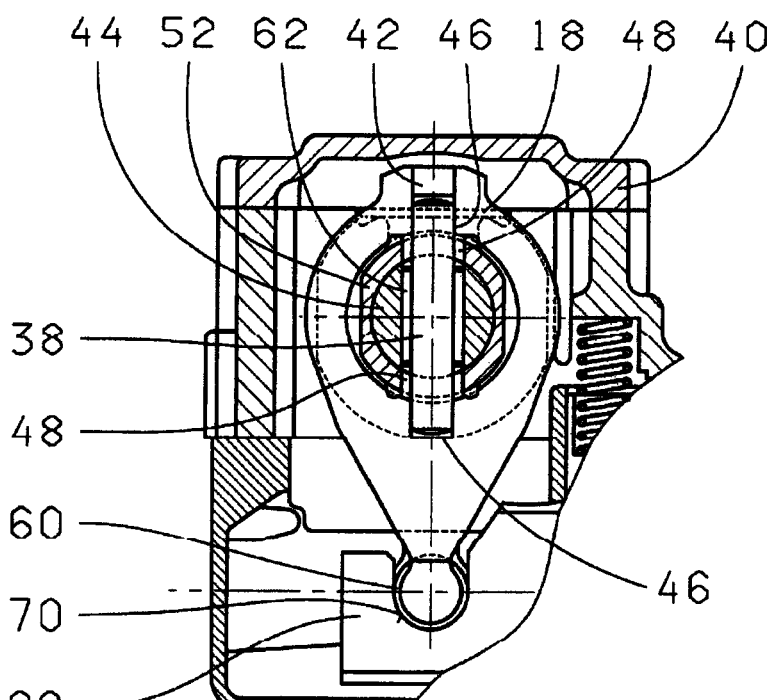
FIG. 3: Sectional view of another embodiment of the shifting device.

FIG. 3 shows another embodiment of the shifting device 40. In contrast to the embodiment of FIG. 2, this embodiment has a pin 38 which is arranged fixed or, via a bearing 62, in the shifting shaft 44. The lever 18 has two continuous axial grooves 46 and a bore 42. The pin 38 is arranged in the grooves 46 in such manner that the shifting shaft 44 can be displaced axially along its axis and rotation of the shifting shaft 44 about its axis causes the lever 18 to pivot. The pin 38 can be fitted thanks to the bore 42. The hollow shaft 52 and the shifting shaft 44 are arranged so that they can move axially relative to one another, preferably with the shifting shaft 44 being able to undergo this axial movement while the hollow shaft 52 cannot move axially. The path limitation in the control system of the servo-assistance mechanism 10 is designed such that appropriate rotational clearance exist between the shifting shaft 44 and the hollow shaft 42, which are realized by the grooves 48 in the hollow shaft 52 and the pin 38.

Figure 4:
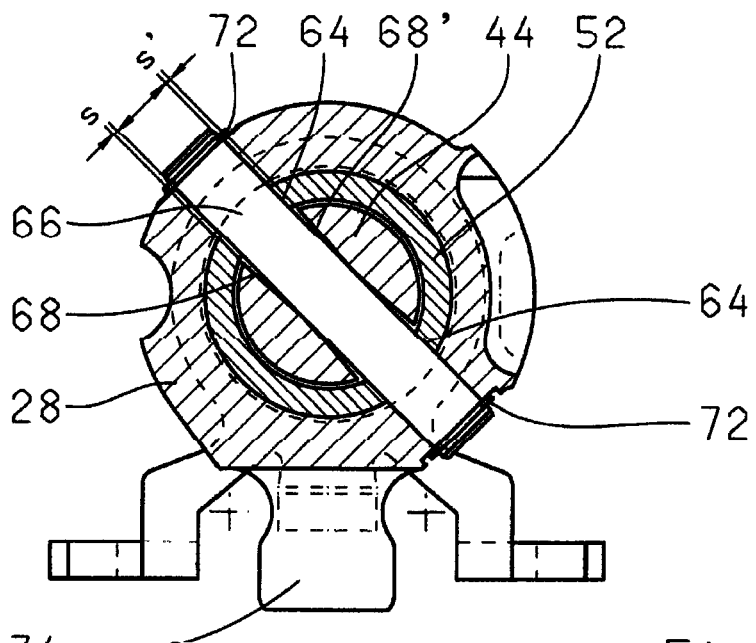
FIG. 4: Sectional view of another embodiment of the shifting device.

FIG. 4 shows a section through the shifting shaft 44 in the area of the lever 28, which engages with projections 74 in shift rails 32 not shown here (see FIG. 1). The lever 28, the hollow shaft 52 and the shifting shaft 44 are penetrated by at least one pin 66. In this area the hollow shaft 52 has two slots 64. The width of the slots 64 in the circumferential direction of the hollow shaft 52 corresponds approximately to the diameter of the pin 66. The pin 66 is held in position, for example, by retaining rings 72. In this area the shifting shaft 44 has a bore, for example a slewed bore. By virtue of the slewed bore, corresponding clearance s, s' are produced between the shifting shaft 44 and the pin 66. Due to these clearance s, s' corresponding rotational clearance 68, 68' are produced between the shifting shaft 44 and the hollow shaft 52. The clearance s, s' can be designed such that the same rotational clearance 68, 68' or different rotational clearance 68, 68' are produced on the two sides between the shifting shaft 44 and the hollow shaft 52. Thus, the clearance s, s' can also be used for a path-dependent limitation of the servo-assisting force.

The slewed bore through the shifting shaft 44, in which the pin 66 is located, can also be made as a slot whereby clearance s, s' of different size can be produced in the axial direction of the shaft 44. Furthermore, instead of the slewed bore a groove can be provided in the shifting shat 44 to produce clearance s, s' of different size between the shaft 44 and the pin 66, and in this case the pin 66 is split. By an appropriate design of the slot or groove a corresponding servo-assistance force can be produced for each gate or gear, and then the selection movement is transmitted to the lever 28 not by the shifting shaft 44, but by another element (not shown here).

Figure 5:
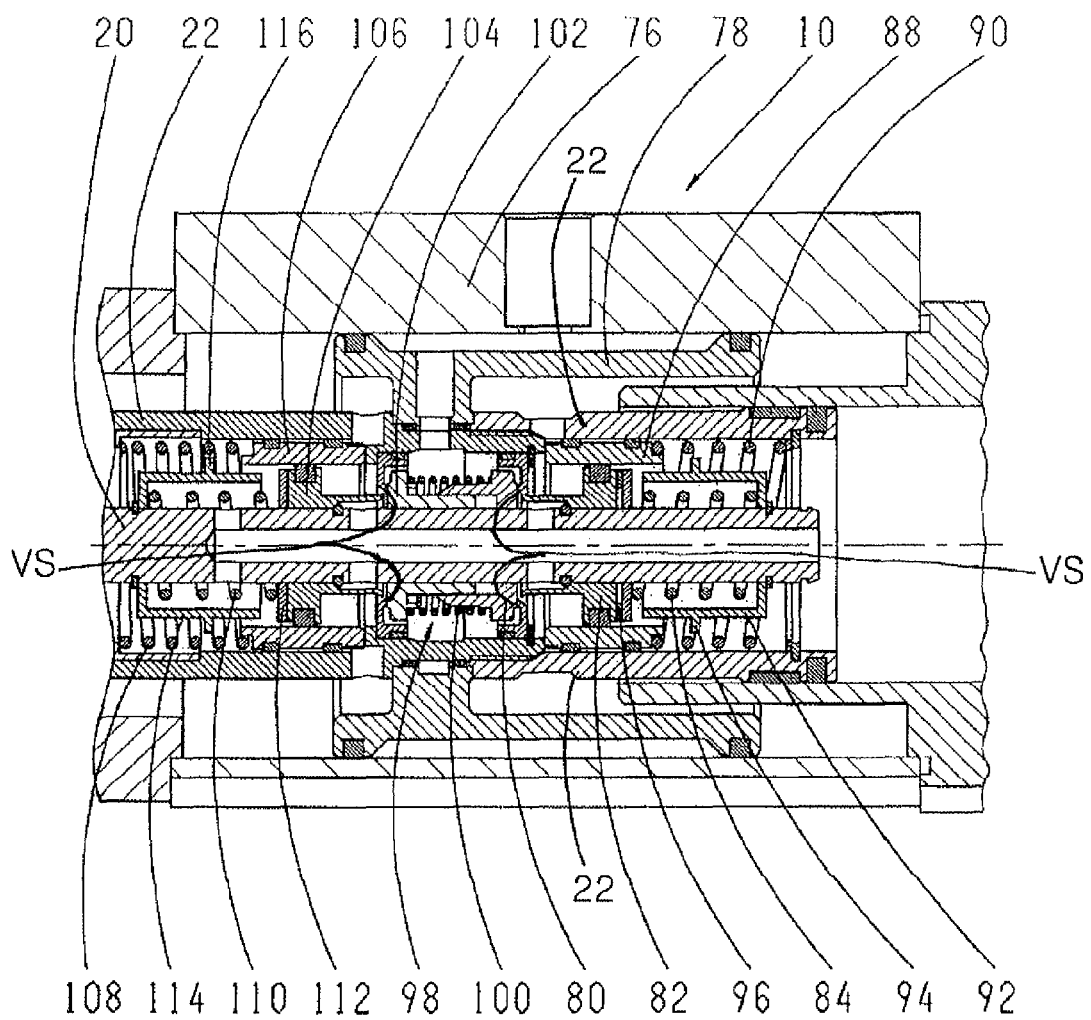
FIG. 5: Sectional view of an embodiment of the servo-assistance mechanism.

FIG. 5 is a sectional representation of part of the servo-assistance mechanism 10. The servo-assistance mechanism 10 comprises a control rod 20 and a piston rod 22 as well as a cylinder 76 and a piston 78. The control rod 20 of the servo-assistance mechanism 10 can move axially within the piston rod 22 and co-operates, via a shift linkage, with a shift lever (see FIG. 1). The piston rod 22 co-operates with means for shifting the geared change-speed transmission (see FIG. 1). The piston 78 and the piston rod 22 are permanently connected together, or made as one component. A valve 98 consists of valve pistons 82, 104 and valve slides 80, 102. In this case the valve pistons 82, 104 are arranged to move axially on the control rod 20 against the spring force of spring elements 84, 110, and when the servo-assistance mechanism 10 is not actuated, are held by the spring elements 84, 110 in their starting position. In this case the spring elements 84, 110 are made as spiral springs and can, for example, even be arranged in the servo-assistance mechanism under pre-stress. Between the valve pistons 84, 104 the valve slides 80, 102 are also arranged axially movably. The valve slides 80, 102 are held axially apart by a spring element 100 and each rests on a valve seat VS of the piston rod 22. The servo-assistance mechanism 10 has two trailing pistons 88, 106 with trailing piston springs 90, 108. In this case the trailing pistons are made in the form of a hollow cylinder and are arranged in the servo-assistance mechanism in such manner that they surround both the control rod 20 and the valve pistons 82, 104, and can move in the axial direction relative to the control rod 20. The trailing piston springs 90, 108 are here made as spiral springs which each have a first end that abuts or bears against the piston rod 22 while an opposite end thereof abuts or bears against the respective trailing pistons 88, 106. The abutment on the piston rod 22 is here in the form of a retaining ring, although it can be formed integrally with the piston rod. When the servo-assistance mechanism 10 is not activated, the valve slides 80, 102 rest against the valve seats of the piston rod 22 and the trailing pistons 88, 106 and are pushed against corresponding abutments of the piston rod 22 by the trailing piston springs 90, 108. On the valve pistons 82, 104 there can also be arranged additional elements 96, 112, for example in the form of disks. In the servo-assistance mechanism are arranged stop elements 92, 114, in this case held by retaining rings, and the spring element 84, 110 are fixed on the control rod 20. The stop elements 92, 114 are here pot-shaped and have abutments 94, 116.

If the control rod 20 is moved to the left in the plane of the drawing by a manual shifting force, the valve piston 82 arranged on the control rod 20 is also moved to the left. The valve piston 82 actuates the valve slide 80, moving it clear of the valve seat of the piston rod 22 so that the valve 98 opens. By virtue of an existing reservoir pressure, the open valve 98 regulates a servo-pressure corresponding to the prevailing control rod force. If, now, the control rod 20 is moved further to the left by increasing the manual shifting force, then because of the force equilibrium reached the valve piston 82 and valve slide 80 remain in their previously reached open positions while the control rod 20 moves farther relative to the two of them and the spring element 84 is compressed farther. This establishes a new force equilibrium, producing a corresponding course of the servo-force. Thus, by virtue of the spring element 84 an internal servo-pressure limitation can be achieved.

If the pressure force acting on the trailing piston 88 due to the regulated servo-pressure is smaller than the force produced by the trailing piston spring 90, then the trailing piston 88 remains in contact with the abutment of the piston rod 22 and the trailing piston spring 90 is not compressed. Thus, the manual shifting force or control rod force opposes only the pressure force acting on the valve piston 82, which corresponds to a regulated setting in the range of the steep servo-characteristic curve.

If, now, the control rod 20 is moved by a larger manual shifting force even farther to the left in the plane of the drawing, then the valve slide 80 too is pushed by the valve piston 82 farther to the left so that the valve 98 opens more. This results in a correspondingly higher servo-pressure. If the regulated servo-pressure is now large enough for the trailing piston spring 90 to be compressed by the trailing piston 88 and the trailing piston 88 to be pushed, against the force of the trailing piston spring 90, onto the abutment 94 of the stop element 92, then the manual shifting force or control rod force opposes both the pressure force acting directly on the valve piston 82 and the pressure force transmitted by the trailing piston 88 and the stop element 92 to the control rod 20. The pressure force opposing the manual shifting force or control rod force is thereby increased and the characteristic curve develops a point of inflexion. This regulated setting corresponds to the range in which the characteristic is flatter. The positions of the control rod 20 and the valve piston 82 do not change, so the "bent" characteristic can be produced in a path-independent manner.

If the regulated servo-pressure now becomes so high that the valve piston 82 is pressed, against the spring force of the spring element 84, onto the stop element 92, then the course of the servo-characteristic curve will correspond to a servo-characteristic curve shape such that the valve piston 82 is in a fixed position on the control rod 20.

The behavior is analogous if the control rod 20 is actuated to the right in the plane of the drawing. In that case the valve slide 102 is actuated by the valve piston 103, whereby the valve slide 102 is raised clear of the valve seat of the piston rod 22 and thus opens the valve 98.

Figure 6:
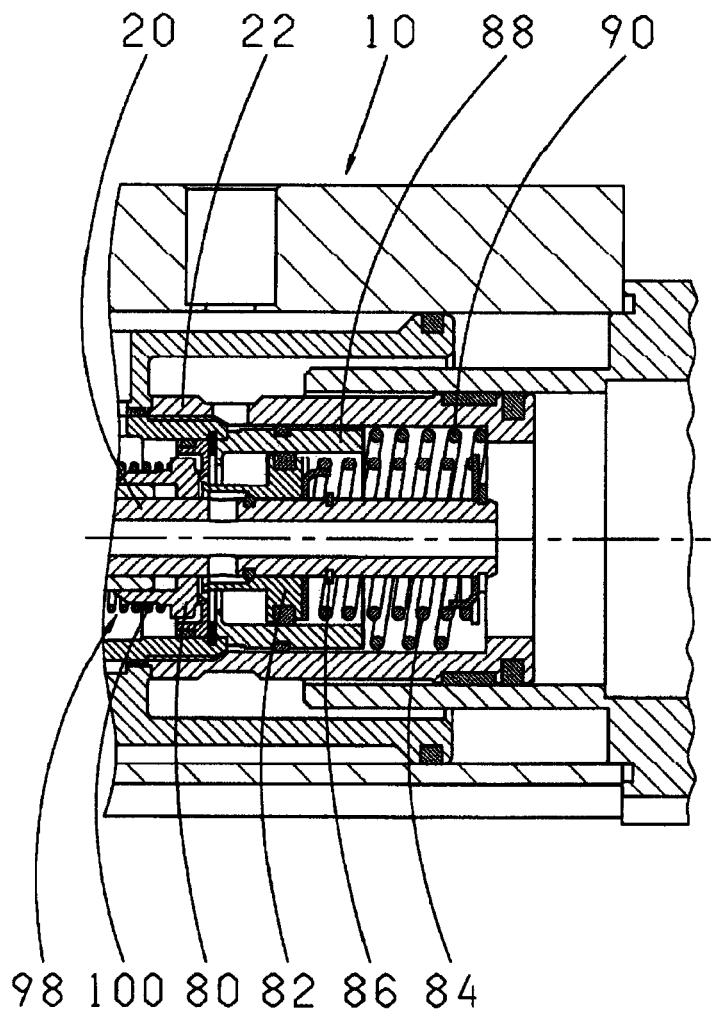
FIG. 6: Sectional view of another embodiment of the servo-assistance mechanism.

FIG. 6 shows a sectioned view of part of another embodiment of the servo-assistance mechanism 10. This embodiment functions in the same way as the embodiment described with reference to FIG. 5. In contrast to the embodiment shown in FIG. 5, however, the trailing piston 88 made as a hollow cylinder has on its side opposite to the trailing piston spring 90 an abutment formed in the direction of the control rod 20. The abutment can for example be made integrally with the trailing pistons 88, 106, as one component. Here too, the trailing piston 88 is arranged so that it surrounds both the control rod 20 and the valve piston 82, and can be moved in the axial direction relative to the control rod 20 against the spring force of the spring element 90. Above a certain manual shifting force the regulated servo-pressure becomes high enough for the trailing piston 88 to be pushed, against the force of the trailing piston spring, onto the valve piston 82. Thus, the manual shifting force or control rod force opposes both the pressure force acting directly on the valve piston 82 and the pressure force transmitted to the valve piston 82 by the trailing piston 88. Accordingly, beyond a certain regulation setting the pressure force that opposes the manual shifting force or control rod force is correspondingly increased, and this produces an inflexion point in the servo-characteristic curve beyond which its gradient is smaller so that it is flatter.

In this case the axial movement of the valve piston 82 is limited by an abutment 86, for example in the form of a retaining ring arranged in a fixed position on the control rod 20.

Figure 7:
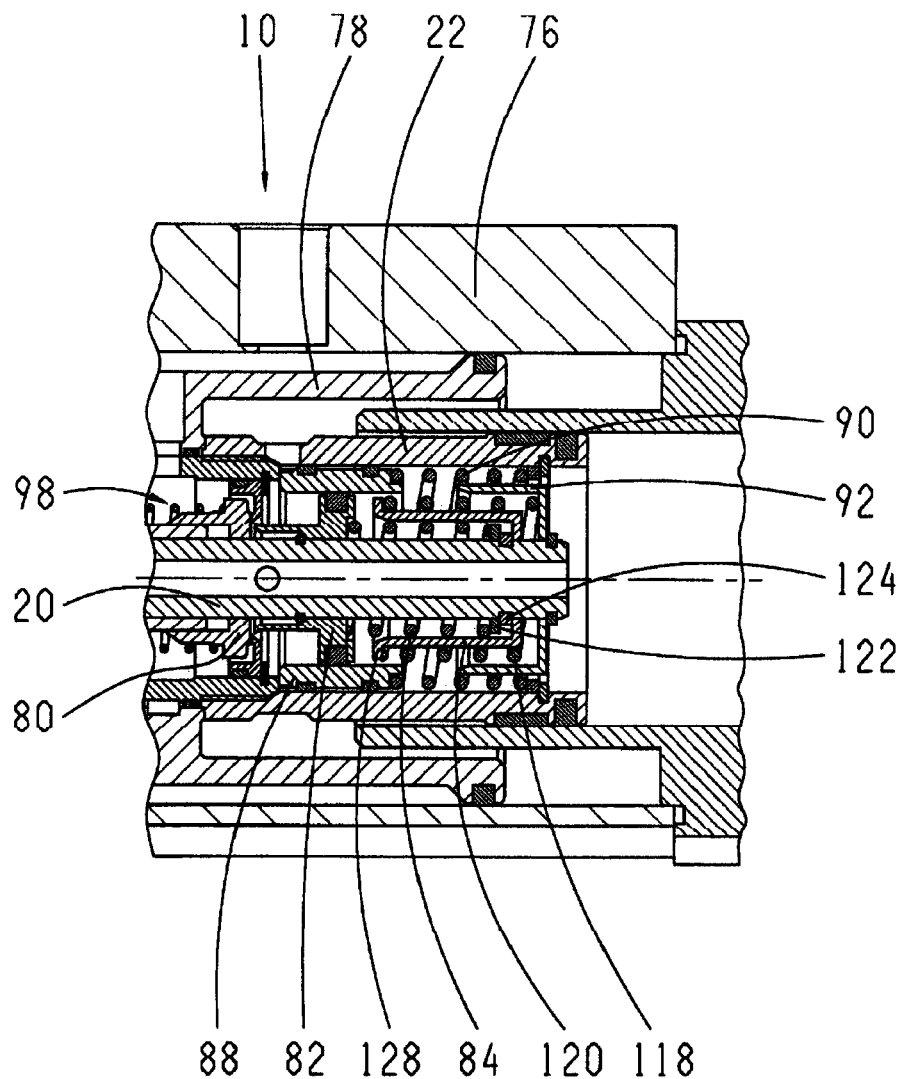
FIG. 7: Sectional view of an embodiment of the servo-assistance mechanism, for producing two different servo-assistance force levels.

FIG. 7 shows a sectioned view of an embodiment of the servo-assistance mechanism 10 according to the invention, in which a servo-assistance force can be limited to two different servo-assistance force levels. In the description below the indexes used are the same as in the description of FIG. 5.

In contrast to FIG. 5 the servo-assistance mechanism 10 has a further spring element 118 and further stop elements 120, 122 and 124. The stop element 124 is arranged fixed on the control rod 20 of the servo-assistance mechanism 10. Here, the spring element 84 is arranged on the control rod 20 in such manner that when the servo-assistance mechanism 120 is not actuated it is fixed between the valve piston 82 and the stop element 124. A stop disk 122 between the stop element 124 and the spring element 84 can serve as an abutment surface for the spring element 84. The stop element 120 is pot-shaped, comprises a radially outward-extending abutment 128 and is arranged, in the radial direction relative to the control rod 20, between the spring element 84 and the spring element 118. Relative to the control rod 20, the spring element 118 is arranged in the radial direction between the stop elements 92 and 120 and, when the servo-assistance mechanism 10 is not actuated, is fixed between the stop element 92, that also serves as the contact surface for the trailing piston 88, and the abutment 128 of the stop element 120, whereby the stop element 120 is brought into contact with the stop element 124.

If the control rod 20 of the servo-assistance mechanism 10 is moved to the left in the drawing plane by a manual shifting force, the valve 98 is opened by the valve piston 82. With the valve 98 open, when a pressure level is reached which is higher than the spring force exerted by the spring element 84 on the valve piston 82, the valve piston 82 moves relative to the control rod 20 until the path limitation in the control system of the servo-assistance mechanism 10 becomes effective, i.e. until the servo-assistance mechanism 10 is mechanically bridged (see the earlier description). This produces a first servo-force level, which acts for example in the gate comprising gears 5/6 of a 6-gear main transmission.

If another gate is now selected, for example the gate for gears 3/4 of the 6-gear main transmission, a second servo-force level can be produced. For this, the path limitation in the control system of the servo-assistance mechanism 10 is designed such that, for example, between the shifting shaft and the groove in the hollow shaft there is a larger rotational clearance in the gate for gears 3/4 than in the gate for gears 5/6 of the 6-gear main transmission (see the earlier description), whereby a larger actuation path is available for the control rod 20 of the servo-assistance mechanism 10 before the servo-assistance mechanism 10 is mechanically bridged and the valve piston 82 moves farther relative to the control rod 20 until it comes up against the stop element 120. If the manual shifting force is now increased further, the valve piston 82 does not move any farther relative to the control rod 20 until a servo-force level is reached that corresponds to the sum of the spring forces exerted by the spring elements 118 and 120 on the valve piston 82. If the manual shifting force is now increased still more, then because of the higher servo-force level the valve piston 82 moves relative to the control rod 20 until, here too, the servo-assistance mechanism 10 is mechanically bridged due to the path limitation in the control system of the servo-assistance mechanism 10.

By virtue of the arrangement of the stop element 120 and the spring element 118 in the servo-assistance mechanism 10, the servo-assistance force can be limited to two different servo-force levels without any increase of the dimensions of, or the structural space occupied by the servo-assistance mechanism 10.

Figure 8:
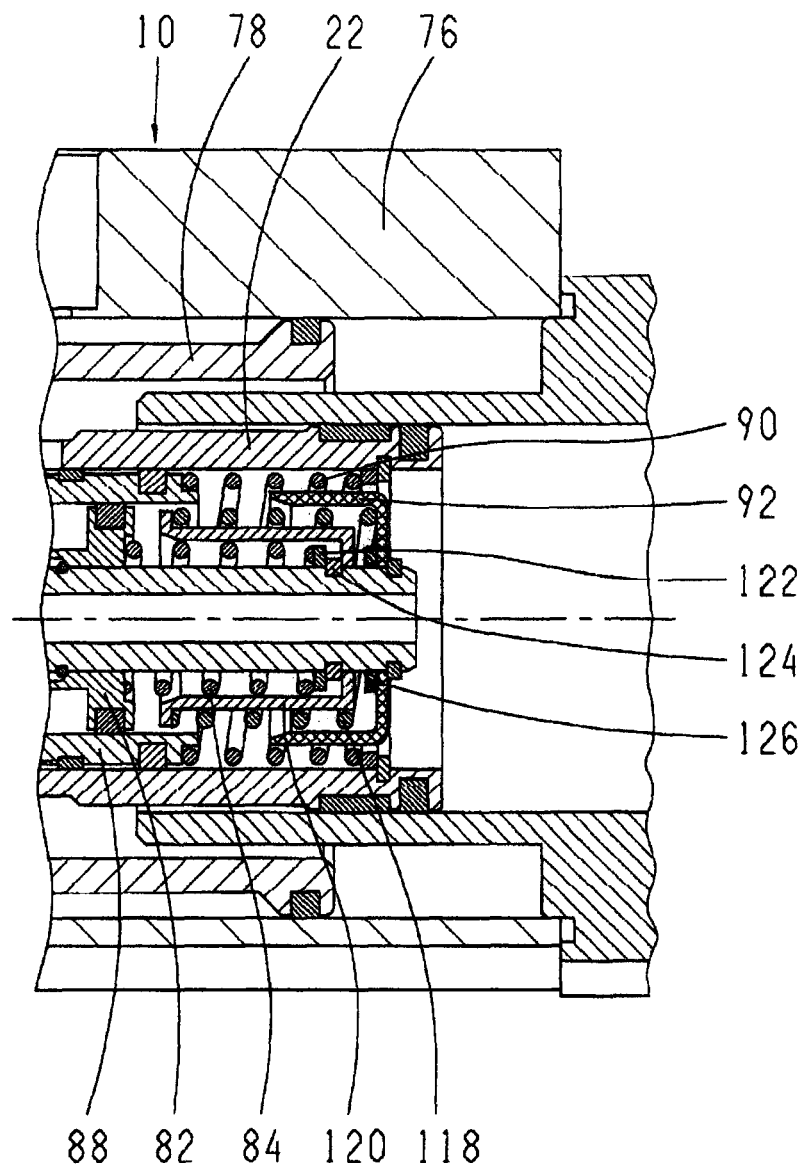
FIG. 8: Sectional view of an embodiment of the servo-assistance mechanism, for producing three different servo-assistance force levels.

FIG. 8 reproduces the servo-assistance mechanism 10 according to FIG. 7, with the difference that in the axial direction of the control rod 20 a further stop element 126, in this case of annular shape, is arranged between the two stop elements 92 and 120. Starting from FIG. 7, from the gate for gears 3/4 the gate for gears 1/2 of the 6-gear main transmission is selected. Here, the path limitation in the control system of the servo-assistance mechanism 10 is designed such that in the gate for gears 1/2 there is an even larger rotational clearance than in the gate for gears 3/4 of the 6-gear main transmission.

If the manual shifting force is now increased still more, the valve piston 82 moves relative to the control rod 20 until it encounters the stop element 126 via the stop element 120 and can therefore move no farther relative to the control rod 20. In this way a third servo-force level can be produced, which corresponds for example to the reservoir pressure present in the motor vehicle. Accordingly for example, the $1^{st}$ gear can be engaged with an unrestricted reservoir pressure.

INDEXES

2 Shifting unit
4 Shift lever
6 Shift rod
8 Lever deflection
9 End-stop
10 Servo-assistance mechanism
11 Shifting device
12 Connection line
14 Reservoir container
16 Lever
18 Lever
20 Control rod
22 Piston rod
24 Lever
26 Shifting shaft
28 Lever
30 Vehicle transmission
32 Shift rail
38 Pin
40 Shifting device
42 Bore
44 Shifting shaft
46 Groove
48 Groove
52 Hollow shaft
54 Groove
56 Pin
58 Needle socket
60 Roller
62 Bearing
64 Slot
66 Pin
68 Rotational clearance
68' Rotational clearance
70 Pocket
72 Retaining ring
74 Projection
76 Cylinder
78 Piston
80 Valve slide
82 Valve piston 84 Spring element
86 Stop element
88 Trailing piston
90 Training piston spring
92 Stop element
94 Abutment
96 Disk
98 Valve
100 Spring element
102 Valve slide
104 Valve piston
106 Trailing piston
108 Trailing piston spring
110 Spring element
112 Disk
114 Stop element
116 Abutment
118 Spring element
120 Stop element
122 Stop element
124 Stop element
126 Stop element
128 Abutment
s Clearance
s' Clearance

The invention claimed is:

1. A shifting device (11, 40) with a servo-assistance mechanism (10) for a transmission (30) of a motor vehicle, the shifting device (11, 40) comprising means for selecting and engaging a gear step of the transmission (30) and control rod (20) upon which a manual shifting force to be assisted acts such that a performance characteristic curve is produced with the servo-assistance mechanism (10) which, as a function of one of the manual shifting force and a shift phase, having ranges with different gradients or proportionalities to the manual shifting force, and the servo-assistance mechanism (10) comprising:

a hollow piston rod (22) which co-operates with means for shifting the transmission (30) and a valve (98) comprising a valve piston (82, 104) and a valve slide (80, 102), the control rod (20) being partially hollow, the shifting device (11, 40) comprising a shifting shaft (44) and a hollow shaft (52), and a trailing piston (88, 106) that co-operates with the valve (98) in the servo-assistance mechanism to produce the characteristic curve, the valve (98) being contained within the hollow piston rod (22) and surrounding the control rod (20), a trailing piston spring (90, 108) being present upon which a servo-pressure acts, a path limitation means in the control system of the servo-assistance mechanism (10) and at least one elastic element (84, 110) are at least one of provided upstream of and in the servo-assistance mechanism (10) to limit a servo-assistance force in a path-dependent manner for each gate or each gear, the trailing piston (88, 106) being arranged inside the piston rod (22), surrounding the control rod (20) and the valve piston (82, 104), and resting against an abutment of the piston rod (22), and the trailing piston spring (90, 108) resting, on one side, against an abutment of the piston rod (22) and, on another side, being connected to the trailing piston (88, 106).

2. The shifting device (11, 40) with the servo-assistance mechanism (10) according to claim 1, wherein the path limitation means have different rotational clearances between at least one pin (56, 38) and a groove in the hollow shaft (52).

3. The shifting device (11, 40) with the servo-assistance mechanism (10) according to claim 1, wherein the path limitation means have various rotational clearances between at least one pin (56) and a groove (54) in the shifting shaft (44).

4. The shifting device (11, 40) with the servo-assistance mechanism (10) according to claim 2, wherein the rotational clearances are adapted to one of the respective gates and gears of the transmission (30).

5. The shifting device (11, 40) with the servo-assistance mechanism (10) according to claim 1, wherein the path limitation means have clearances (s, s') between the shifting shaft (44) and a pin (66) such that corresponding rotational clearances (68, 68') are produced between the shifting shaft (44) and the hollow shaft (52).

6. The shifting device (11, 40) with the servo-assistance mechanism (10) according to claim 5, wherein the clearances (s, s'), between the shifting shaft (44) and the pin (66), are produced by one of a slot and a groove in the shifting shaft (44).

* * * * *